United States Patent
Park et al.

(10) Patent No.: US 12,284,450 B2
(45) Date of Patent: Apr. 22, 2025

(54) IMAGING APPARATUS AND METHOD OF CONTROLLING THE SAME

(71) Applicant: Samsung Display Co., Ltd., Yongin-si (KR)

(72) Inventors: Sun Young Park, Suwon-si (KR); Tae-Ho Kim, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 110 days.

(21) Appl. No.: 17/387,898

(22) Filed: Jul. 28, 2021

(65) Prior Publication Data

US 2022/0166916 A1    May 26, 2022

(30) Foreign Application Priority Data

Nov. 26, 2020 (KR) .................. 10-2020-0161168

(51) Int. Cl.
*H04N 23/745* (2023.01)
*G03B 5/00* (2021.01)
*G06N 20/00* (2019.01)
*H04N 25/531* (2023.01)

(52) U.S. Cl.
CPC ............ *H04N 23/745* (2023.01); *G03B 5/00* (2013.01); *G06N 20/00* (2019.01); *H04N 25/531* (2023.01)

(58) Field of Classification Search
CPC ........ G03B 5/00; G06N 20/00; H04N 23/745; H04N 25/531
See application file for complete search history.

(56) References Cited

U.S. PATENT DOCUMENTS

| | | | |
|---|---|---|---|
| 8,736,748 B2 | 5/2014 | Takita | |
| 8,743,240 B2 | 6/2014 | Horiuchi | |
| 10,587,817 B2 | 3/2020 | Kim et al. | |
| 10,878,739 B2 | 12/2020 | Yi et al. | |
| 10,970,825 B2 | 4/2021 | Murase | |
| 2006/0284992 A1* | 12/2006 | Kinoshita | H04N 23/745 348/226.1 |
| 2010/0201866 A1 | 8/2010 | Jung et al. | |
| 2012/0212663 A1* | 8/2012 | Takita | H04N 23/75 348/E5.04 |
| 2017/0366730 A1 | 12/2017 | Onodera | |
| 2018/0205869 A1* | 7/2018 | Kim | H04N 25/531 |
| 2021/0274084 A1* | 9/2021 | Hejl | G06K 7/1095 |

FOREIGN PATENT DOCUMENTS

| | | |
|---|---|---|
| JP | 2012-175385 | 9/2012 |
| JP | 2019-169874 | 10/2019 |
| KR | 10-2010-0091845 | 8/2010 |
| KR | 10-2014-0140773 | 12/2014 |
| KR | 10-2018-0083593 | 7/2018 |
| KR | 10-1950396 | 2/2019 |
| KR | 10-2019-0082261 | 7/2019 |
| KR | 10-2020-0003534 | 1/2020 |

* cited by examiner

*Primary Examiner* — Antoinette T Spinks
(74) *Attorney, Agent, or Firm* — KILE PARK REED & HOUTTEMAN PLLC (57) ABSTRACT

An imaging apparatus includes an imaging element, an imaging driver, a controller, and a memory. The imaging driver is configured to drive the imaging element. The controller is configured to detect a flicker in an image captured by the imaging apparatus. The memory is configured to, in response to the flicker being detected, store data on a characteristic of the flicker, a first frame rate, and a first shutter speed of the imaging element.

19 Claims, 4 Drawing Sheets

IMAGING APPARATUS AND METHOD OF CONTROLLING THE SAME

CROSS-REFERENCE TO RELATED APPLICATIONS

This application claims priority to and the benefit of Korean Patent Application No. 10-2020-0161168, filed Nov. 26, 2020, which is hereby incorporated by reference for all purposes as if fully set forth herein.

BACKGROUND

Field

One or more embodiments generally relate to an imaging apparatus and a method of controlling the same.

Discussion

When an imaging apparatus captures a subject under illumination using an alternating current (AC) power source, luminance noise may occur in a captured image. A periodic change in luminance that occurs in an image is referred to as flicker. When an imaging apparatus captures a panel of a display device in which pixels are positioned, flicker may occur due to a shift between a period during which an image is captured by the imaging apparatus and a period during which an image is displayed by the display device. To mitigate the flicker, a technique for adjusting an AC frequency of the light source or changing a period during which an image is displayed have been proposed in the case of a display device, but it is difficult to change the AC frequency or the period in which the image is displayed for existing light sources and/or display devices.

The above information disclosed in this section is only for understanding the background of the inventive concepts, and, therefore, may contain information that does not form prior art.

SUMMARY

One or more embodiments provide an imaging apparatus capable of reducing a flicker that might otherwise occur in a captured image, and, in this manner, capable of improving quality of a captured image.

One or more embodiments provide a method of controlling an imaging apparatus capable of reducing a flicker that might otherwise occur in a captured image, and, in this manner, capable of improving quality of a captured image.

Additional aspects will be set forth in the detailed description which follows, and, in part, will be apparent from the disclosure, or may be learned by practice of the inventive concepts.

According to an embodiment, an imaging apparatus includes an imaging element, an imaging driver, a controller, and a memory. The imaging driver is configured to drive the imaging element. The controller is configured to detect a flicker in an image captured by the imaging apparatus. The memory is configured to, in response to the flicker being detected, store data on a characteristic of the flicker, a first frame rate, and a first shutter speed of the imaging element.

According to an embodiment, an imaging apparatus includes an imaging element and a controller. The imaging element includes a shutter unit and a plurality of pixels. The imaging element is configured to convert light received by opening and closing the shutter unit into an electric signal. The controller is configured to: detect whether or not a flicker exists in an image captured by the imaging element and a flicker characteristic; and drive the imaging element at a first frame rate and a first shutter speed based on the flicker characteristic.

According to an embodiment, a method of controlling an imaging apparatus includes: performing, via an imaging element, imaging at a first frame rate and a first shutter speed; detecting, via a controller, a flicker in a captured image; storing, in response to a flicker being detected, a flicker characteristic, a frame rate, and a shutter speed in a memory; and changing, via the controller, the first shutter speed to a second shutter speed in response to the flicker being detected in the captured image. The second shutter speed is different from the first shutter speed.

According to an embodiment, an apparatus includes an imaging unit, at least one processor, and at least one memory. The imaging unit is configured to capture an image. The least one memory includes one or more sequences of one or more instructions that, in response to being executed by the at least one processor, cause the apparatus at least to: capture, via the imaging element, an image at a first frame rate and a first shutter speed; detect a flicker in the image; store, in response to the flicker being detected, a flicker characteristic, a frame rate, and a shutter speed in the memory; and change, in response to the flicker being detected in the image, the first shutter speed to a second shutter speed. The second shutter speed is different from the first shutter speed.

According to various embodiments, a flicker that appears in an image displayed by an imaging apparatus may be reduced.

According to various embodiments, the quality of a display apparatus may be improved.

According to various embodiments, a time it takes to reduce flicker is reduced.

According to various embodiments, flicker may be automatically reduced without changing the settings of an imaging apparatus.

The foregoing general description and the following detailed description are illustrative and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate embodiments of the inventive concepts, and, together with the description, serve to explain principles of the inventive concepts.

DETAILED DESCRIPTION OF SOME EMBODIMENTS

In the following description, for the purposes of explanation, numerous specific details are set forth in order to provide a thorough understanding of various embodiments. As used herein, the terms "embodiments" and "implementations" may be used interchangeably and are non-limiting examples employing one or more of the inventive concepts disclosed herein. It is apparent, however, that various embodiments may be practiced without these specific details or with one or more equivalent arrangements. In other instances, well-known structures and devices are shown in block diagram form to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing example features of varying detail of some embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

In the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing some embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the inventive concepts. Further, the blocks, units, and/or modules of some embodiments may be physically combined into more complex blocks, units, and/or modules without departing from the inventive concepts.

Hereinafter, various embodiments will be explained in detail with reference to the accompanying drawings.

Figure 1:
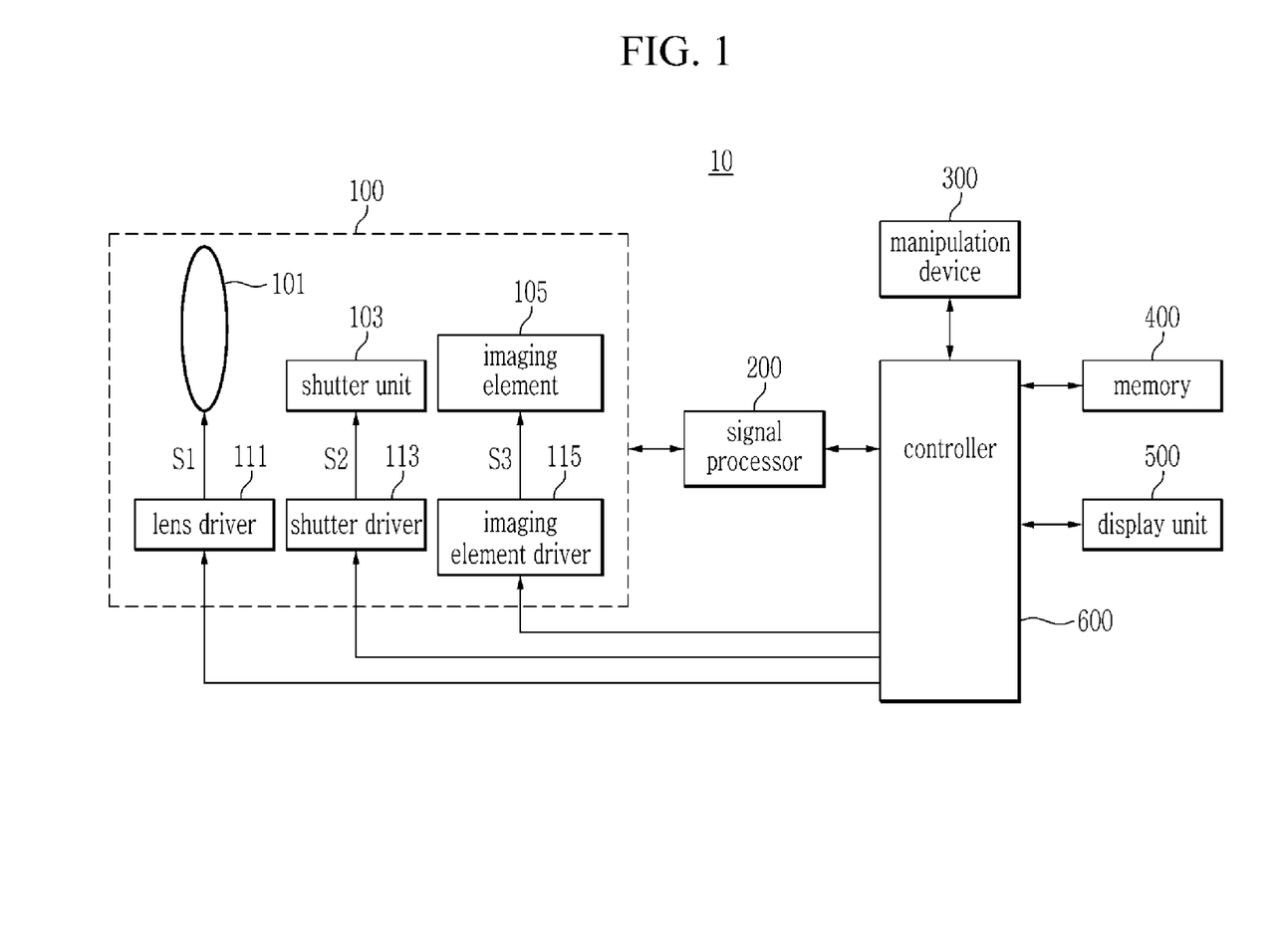
FIG. 1 schematically illustrates a configuration of an imaging apparatus according to an embodiment.

FIG. 1 illustrates a configuration of an imaging apparatus 10 according to an embodiment.

The imaging apparatus 10 converts light into electricity. The imaging apparatus 10 may be implemented in various forms such as, e.g., a camera, a mobile phone, a smart phone, a tablet personal computer (PC), a laptop computer, a camcorder, and/or the like, and may be another apparatus having an imaging function capable of capturing a moving image.

The imaging apparatus 10 may include an imaging unit 100, a signal processor 200, a manipulation device 300, a memory 400, a display unit 500, and a controller 600.

The imaging unit 100, which is configured to convert incident light into an electrical signal, may include a lens unit 101, a shutter unit 103, an imaging element 105, a lens driver 111, a shutter driver 113, and an imaging element driver 115.

The imaging unit 100 may be controlled by a control signal received from the controller 600. The control signal may include at least one of a first control signal S1 for controlling the lens unit 101, a second control signal S2 for driving the shutter unit 103, and a third control signal S3 for driving the imaging element 105.

The lens unit 101 is for condensing light received from a subject onto the imaging element 105. The lens unit 101 may include a plurality of lenses.

The lens driver 111 may adjust a position or other configuration of the lens unit 101 through a first control signal S1. The position of the lens unit 101 may be changed along an optical axis direction by the lens driver 111.

The shutter unit 103 is for adjusting an amount of light that is introduced into the imaging element 105 by controlling the light passing through the lens unit 101 and entering the imaging element 105. For example, when an image capturing environment is bright with a sufficient amount of light, an opening time of the shutter unit 103 may be short, but when the image capturing environment is dark with an insufficient amount of light, the opening time of the shutter unit 103 may be long.

The shutter unit 103 may be a mechanical shutter that controls the incidence of light by moving an aperture and/or an electronic shutter that controls exposure by supplying an electric signal to the imaging element 105. The shutter unit 103 may operate in (or according to) a global shutter method by which charge accumulation timing is adjusted in units of surfaces, or a rolling shutter method by which charge accumulation timing is adjusted in units of lines. This will be described in more detail with reference to FIG. 2.

The shutter driver 113 may adjust an opening/closing time of the shutter unit 103 through a second control signal S2. A shutter speed of the shutter unit 103 may be adjusted by the shutter driver 113. The shutter speed refers to a length of time during which the shutter unit 103 is open, and may be proportional to an exposure time of the imaging element 105.

For example, when the imaging apparatus 10 captures a video displayed by a display device (e.g., display unit 500), the imaging apparatus 10 may receive light from a pixel positioned in (or as part of) a panel of the display device while the shutter unit 103 is open. When a reciprocal (driving period) of a driving frequency of the display device is smaller than the shutter speed of the imaging apparatus 10, the display device may be turned off while the shutter unit 103 of the imaging apparatus 10 is open. In this case, brightness of some images included in a video captured by the imaging apparatus 10 may be dark. Accordingly, a flicker phenomenon may also appear in a video acquired by the imaging apparatus 10. In addition, some portions of a screen may be turned off depending on a driving method of the display device. Even in this case, since the brightness of some images included in the video captured by the imaging apparatus 10 may be dark, a flicker phenomenon may appear in the image acquired by the imaging apparatus 10. However, it is recognized that when the shutter speed, e.g., the exposure time, of the imaging apparatus 10 is set as a driving cycle of the display device, an exposure amount becomes constant regardless of exposure timing such that a flicker phenomenon may not appear in the video.

The imaging element 105 is for photoelectric conversion of light that is introduced through the lens unit 101 and the shutter unit 103 into an electric signal. The imaging element 105 may receive light only during the exposure time adjusted by the shutter unit 103, and charges generated by photoelectric conversion may be accumulated in each of a plurality of pixels in the imaging element 105.

The imaging element 105 may be, e.g., a charge coupled device (CCD) image sensor, a complementary metal oxide semiconductor (CMOS) image sensor, and/or the like.

As described later, the imaging element 105 includes a pixel portion 1051, a vertical scan circuit portion 1053, a column circuit portion 1055, a horizontal scan circuit portion 1057, and signal lines SL0 to SLn and DL0 to DLm.

The imaging element driver 115 may control the imaging element 105 through a third control signal S3. The imaging element 105 may perform imaging operations, such as exposure, signal reading, and reset by the imaging element driver 115 operating under control of the controller 600.

The imaging element 105 may output an electrical signal generated by photoelectric conversion of incident light to the signal processor 200.

A frame rate of a signal that is output from the imaging element 105 may be determined by a control signal supplied from the imaging element driver 115. The imaging element driver 115 may set a different frame rate for each frame.

The signal processor 200 may perform noise reduction processing, waveform shaping, analog-digital conversion processing, and/or the like on an analog electrical signal photoelectrically converted by the imaging element 105. A digital signal processed by the signal processor 200 may be input to the controller 600, and may be stored in the memory 400.

In some embodiments, the signal processor 200 may read an image signal stored in the memory 400, may convert the signal into an analog signal suitable for output, and may display it through the display unit 500.

The manipulation device 300 is for receiving a control signal from a user. The manipulation device 300 may be implemented in any form to which a user can input a control signal, such as one or more of a button, a keyboard, a touch pad, a touch screen, a remote controller, and the like.

The manipulation device 300 may include a power button for inputting a control signal to control the turning on/off of power, a shutter-release button for inputting a shutter-release signal for taking a picture by exposing the imaging element 105 to light for a predetermined time, a zoom button for inputting a control signal to widen or narrow a viewing angle, buttons for adjusting other imaging settings such as exposure, a shutter speed, aperture, and an International Standards Organization (ISO) sensitivity, and/or the like.

When a control signal is input from a user through the manipulation device 300, the controller 600 may generate a control signal corresponding thereto to transfer it to a corresponding component.

For example, when a shutter-release signal is input through a shutter-release button, the controller 600 may allow the imaging element driver 115 to input an imaging signal for one frame to the imaging element 105. Thereafter, the imaging element 105 may photoelectrically convert light for one frame into an electrical signal, and may transfer the photoelectrically converted electrical signal for one frame to the signal processor 200.

The memory 400 is for storing various information used for operating the imaging apparatus 10 and/or stored by the imaging apparatus 10.

The memory 400 may be a semiconductor memory 400, such as a flash memory 400 having a removable card shape or a stick shape, or a recording medium, such as an optical disk, a hard disk drive (HDD), or a magnetic tape. In other words, the memory 400 may be implemented in any suitable form, including, but not limited to, non-volatile media, volatile media, and transmission media. In addition, in the case of the imaging apparatus 10 having a communication function, the memory 400 may be a memory 400 of an arbitrary server device connected to through a network.

The memory 400 may store a digital signal that is output through the signal processor 200.

The memory 400 may store a flicker characteristic and data of a condition in which the flicker characteristic is recognized. The flicker characteristic may be data on at least one of, e.g., a number of stripes caused by a flicker in one frame image, a distance between the stripes, and an intensity of the stripes. The data on the condition in which the flicker characteristic is recognized may be, e.g., data on a frame rate and/or shutter speed of the imaging apparatus 10.

For example, when the imaging apparatus 10 captures a video displayed on the display device at a specific frame rate and a specific shutter speed, the memory 400 may store data on a flicker characteristic detected from captured images, and data on a frame rate and a shutter speed at that time.

The display unit 500 is for displaying an image corresponding to image data that is sent from the controller 600 on the display unit 500. The display unit 500 may include a display device, such as a liquid crystal display, an organic light emitting diode display, etc.

The controller 600 is for controlling (such as comprehensively controlling) the imaging apparatus 10. The controller 600 may be, e.g., a microcontroller having a central processing unit (CPU), a read-only memory (ROM) 400, and a random-access memory (RAM) 400, but embodiments are not limited thereto.

The controller 600 may execute various processes, such as at least one of mode change processing, imaging processing, and setting of imaging conditions depending on an input signal that is input through the manipulation device 300.

The controller 600 may generate control signals for controlling operations of the lens unit 101, the shutter unit 103, and the imaging element 105 to supply them to the lens driver 111, the shutter driver 113, and the imaging element driver 115. For example, the controller 600 may control the imaging element driver 115 to generate various control signals for driving the imaging element 105 and supply them to the imaging element 105. The controller 600 may also control the shutter driver 113 to change the shutter speed of the shutter unit 103.

The controller 600 may detect whether a flicker exists in images stored in the memory 400.

The controller 600 may integrate a video signal obtained by the signal processor 200 in a horizontal direction of a screen, may acquire an integral value of the video signal for each line, and may detect a flicker by calculating (or determining) a difference between integral values of adjacent lines. In this case, only the flicker component may remain in the difference value, and thus, the controller 600 may detect that a flicker exists in the images generated from the imaging element 105.

Figure 2:
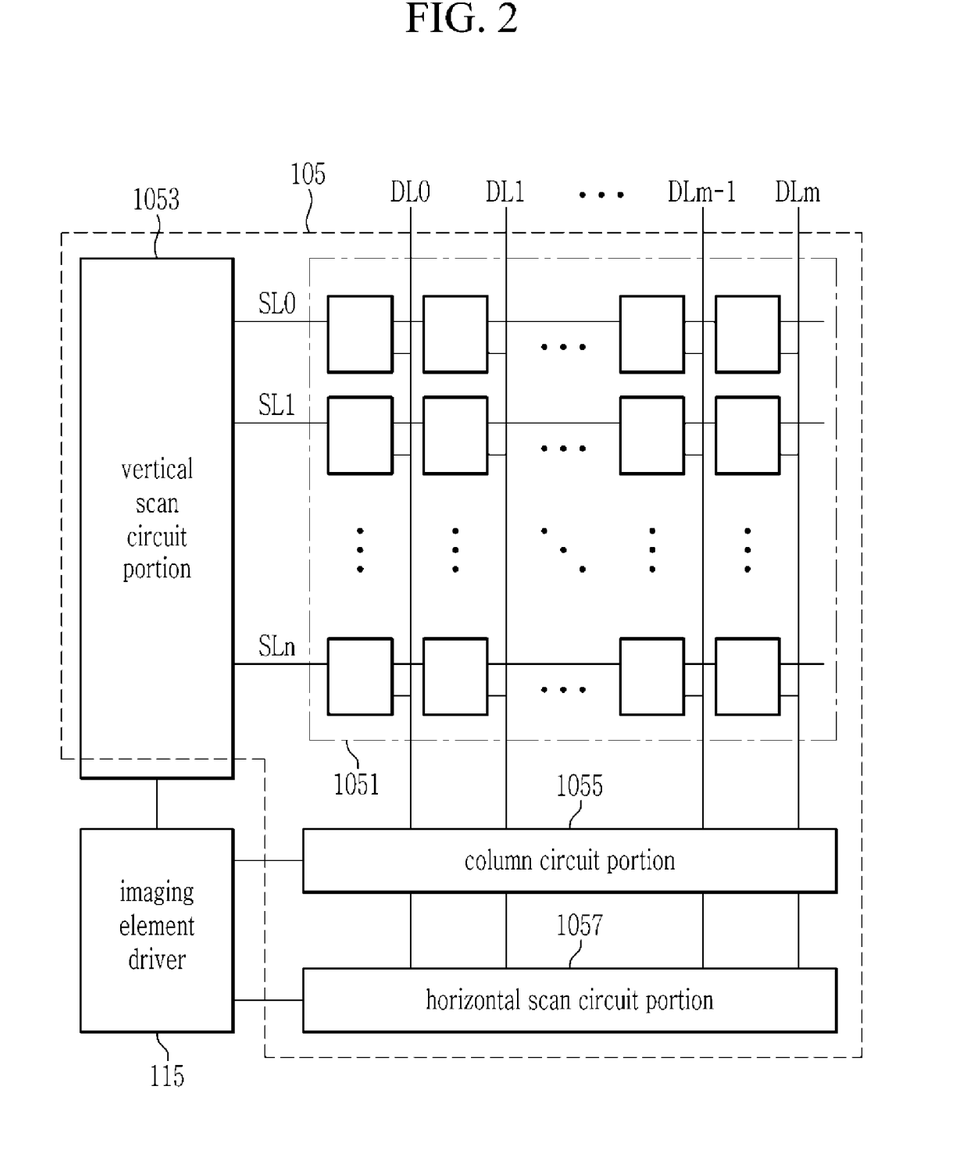
FIG. 2 schematically illustrates an imaging element and an imaging element driver according to an embodiment.

For example, when the display device that performs imaging is a monitor, four corners of the monitor may be characteristic points for searching for a position of the display device. The controller 600 may detect the display device based on the searched characteristic points, and may separate a screen of the display device therefrom. Referring to FIG. 2, the controller 600 may calculate an integral value of a video signal generated by photoelectric conversion performed by pixels positioned on a signal line SL0. In addition, the controller 600 may calculate an integral value of a video signal of pixels positioned on a signal line SL1 adjacent to the signal line SL0. Thereafter, the controller 600 may calculate a difference between the integral value of the signal line SL0 and the integral value of the signal line SL1. When a difference value exists, the controller 600 may determine that a flicker exists in the images.

This method not only detects flicker, but also recognizes and detects a stripe in a video as a flicker. To improve this, the controller 600 may generate a difference image between a plurality of adjacent images to perform the method on a video signal of the generated difference image.

The controller 600 may also generate a difference image between adjacent images from a plurality of images obtained by the signal processor 200, and may detect a flicker in a manner that performs a combination in a way that detects pixel value variations in a direction perpendicular to each scan direction. In this case, the plurality of images may be a screen imaged at a same frame rate and a same shutter speed, and processed as a still video. For instance, the controller 600 may calculate an average value and a standard deviation of luminance values in a vertical direction in the difference image to detect whether a flicker exists in the images.

For example, the controller 600 may acquire a plurality of images by capturing the display device at the same frame rate and the same shutter speed. After acquiring an image A and an image B adjacent thereto among the plurality of images, the controller 600 may perform subtraction of the two images by a pixel unit (A-B) or perform division of the two images by a pixel unit (A/B). Accordingly, a flicker component that may exist in a plurality of images may appear prominently. The controller 600 may detect a flicker at a position of a pixel having a large difference (A-B) between respective pixels of the two images or a result value (AB) obtained by dividing each pixel of the two images.

In addition, the controller 600 may detect a flicker through an arbitrary method.

The controller 600 may infer a frame rate and a shutter speed at which a flicker is reduced from data stored in the memory 400 by using a pre-learned deep learning/machine learning model. For example, the deep learning/machine learning model may be a model learned to determine a frame rate and a shutter speed at which a flicker is reduced by using a plurality of flicker characteristics and corresponding frame rates and shutter speeds in advance. In addition, the deep learning/machine learning model may classify a plurality of images stored in the memory 400 into an image having a flicker characteristic in which a number of stripes is 0 and an image having a flicker characteristic in which the stripes are light, etc., to infer a flicker-free frame rate and a flicker-free shutter speed based on this.

Thereafter, the controller 600 may control the imaging element driver 115 to drive the imaging element 105 at the frame rate and the shutter speed that are determined.

In the case where a flicker is still detected even when imaging is performed with the frame rate and the shutter speed that are determined, the controller 600 may store information related to a detected new flicker characteristic, a current frame rate, and a shutter speed in the memory 400. In addition, the data stored in the memory 400 may be input back to the deep learning/machine learning model and used to learn additional information and/or improve upon the information already learned, and the learned deep learning/machine learning model may determine a new frame rate and shutter speed at which the flicker is reduced.

FIG. 2 illustrates an imaging element 105 and an imaging element driver 115 according to an embodiment.

The imaging element driver 115 controls the imaging element 105 through the third control signal S3 under the control of the controller 600. The imaging element 105 is driven by the third control signal S3 received from the imaging element driver 115.

As described above, the imaging element 105 includes a pixel portion 1051, a vertical scan circuit portion 1053, a column circuit portion 1055, a horizontal scan circuit portion 1057, and signal lines SL0 to SLn and DL1 to DLm.

The pixel portion 1051 may have a plurality of pixels that are arranged in a two-dimensional matrix form. Each pixel may convert light into an electrical signal.

The vertical scan circuit portion 1053 may receive the third control signal S3 from the imaging element driver 115, and may supply a driving pulse to each pixel. A frequency of the driving pulse supplied to the pixels by the vertical scan circuit portion 1053 is referred to as a vertical synchronization frequency.

The vertical scan circuit portion 1053 may sequentially supply driving pulses to a plurality of pixels connected to the respective signal lines SL0 to SLn.

As the vertical scan circuit portion 1053, a logic circuit, such as a shift register or an address decoder, may be used. In some embodiments, the vertical synchronization frequency may be the same as a frame rate of the imaging element 105.

The signal lines SL0 to SLn may be positioned for each row of each pixel in the pixel portion 1051. In addition, the signal lines DL0 to DLm may be positioned for each column of each pixel in the pixel portion 1051. While receiving a driving pulse from the vertical scan circuit portion 1053 through the signal lines SL0 to SLn, charges may be accumulated in the pixels connected to the respective signal lines SL0 to SLn. Thereafter, the electric signals converted by the pixels may be output to the column circuit portion 1055 through the signal lines DL0 to DLm.

The column circuit portion 1055 may receive an electrical signal output from the pixel portion 1051 through the signal lines DL0 to DLm. The column circuit portion 1055 may perform processing, such as noise removal and signal amplification, on the input electrical signal.

The horizontal scan circuit portion 1057 may supply a driving signal for sequentially outputting the signals processed by the column circuit portion 1055 to the signal processor 200 and to the column circuit portion 1055. In response to the driving signal being received from the horizontal scan circuit portion 1057, the column circuit portion 1055 may output processed signals to the signal processor 200.

As described above, the imaging element 105 may be a CCD image sensor or a CMOS image sensor, and the image sensor may operate in a global shutter method or a rolling shutter method.

The vertical scan circuit portion 1053 may supply different driving pulses to the respective pixels depending on the shutter method.

There may be a case where a driving frequency of the display device is 100 Hz, and a vertical synchronization frequency of the imaging apparatus 10 is 60 Hz. When the vertical synchronization frequency is 60 Hz, one vertical synchronization signal may be input to each signal line SL0 to SLn every $1/60$ of a second.

In this case, when the shutter speed is $1/100$ of a second, an exposure amount at each signal line SL0 to SLn becomes constant (or substantially constant) regardless of the exposure timing, and thus, a flicker will not occur. In addition, no flicker will occur even when the shutter speed is $1/50$ of a second or $3/100$ of a second.

As such, when the shutter speed is an integer multiple of the driving period of the display device, it is assumed that the driving frequency of the display device and the shutter speed of the imaging apparatus 10 are synchronized. When the driving frequency of the display device and the shutter speed of the imaging apparatus 10 are synchronized, a flicker may not occur. For instance, since an amount of light irradiated to each pixel in the display device is the same, an integral value of luminance during the same exposure time may be the same in each frame.

However, in the case of a conventional shutter with a shutter speed of $1/60$ of a second, the driving frequency of the display device and the shutter speed of the imaging apparatus 10 are not synchronized, and thus, even when each signal line SL0 to SLn has the same exposure time, integral values of the luminance may be different. Thus, a flicker may occur.

As another example, there may be a case where the driving frequency of the display device is 120 Hz and the vertical synchronization frequency of the imaging apparatus 10 is 100 Hz.

In this case, when the shutter speed is $1/120$ of a second or $1/60$ of a second, the exposure amount at each signal line SL0 to SLn may be constant regardless of the exposure timing. In this manner, since the shutter speed is an integer multiple of the driving frequency of the display device, a flicker may not occur.

However, when the shutter speed is a conventional shutter with $1/100$ of a second or is not an integer multiple of the driving frequency of the display device, the integral values of the luminance may be different for each of the signal lines SL0 to SLn, and thus, flicker may occur.

As another example, there may be a case where the driving frequency of the display device is 120 Hz and the vertical synchronization frequency of the imaging apparatus 10 is 60 Hz.

In this case, in the case of a conventional shutter having a shutter speed of $1/60$ of a second, the exposure amount becomes constant irrespective of the exposure timing, and thus, a flicker may not occur. Of course, even when the shutter speed is $1/120$ of a second, a flicker will not occur. For instance, for each signal line SL0 to SLn, the integral values of the luminance of the display device may be the same in an exposure time range.

However, even in this case, when the driving frequency of the display device and the shutter speed of the imaging apparatus 10 are not synchronized, a flicker may occur.

Accordingly, when the exposure time and/or the shutter speed of the imaging apparatus 10 is an integer multiple of the reciprocal of the driving frequency of the display device, the integral values of the luminance of the display device are the same within one frame of the imaging apparatus 10 such that no flicker may occur in the image of the imaging apparatus 10.

However, the exposure time and/or the shutter speed of the imaging apparatus 10 should be equal to or shorter than the vertical period of the imaging apparatus 10. Accordingly, when it is desired to increase the shutter speed, there may be a case where the vertical synchronization frequency is to be decreased.

In addition, as the frame rate of the imaging apparatus 10 increases, the number of stripes becomes relatively small. For example, when the driving frequency of the display device is 100 Hz and the frame rate of the imaging apparatus 10 is 20 Hz, the number of flicker stripes included in one image may be 5.

Figure 3:
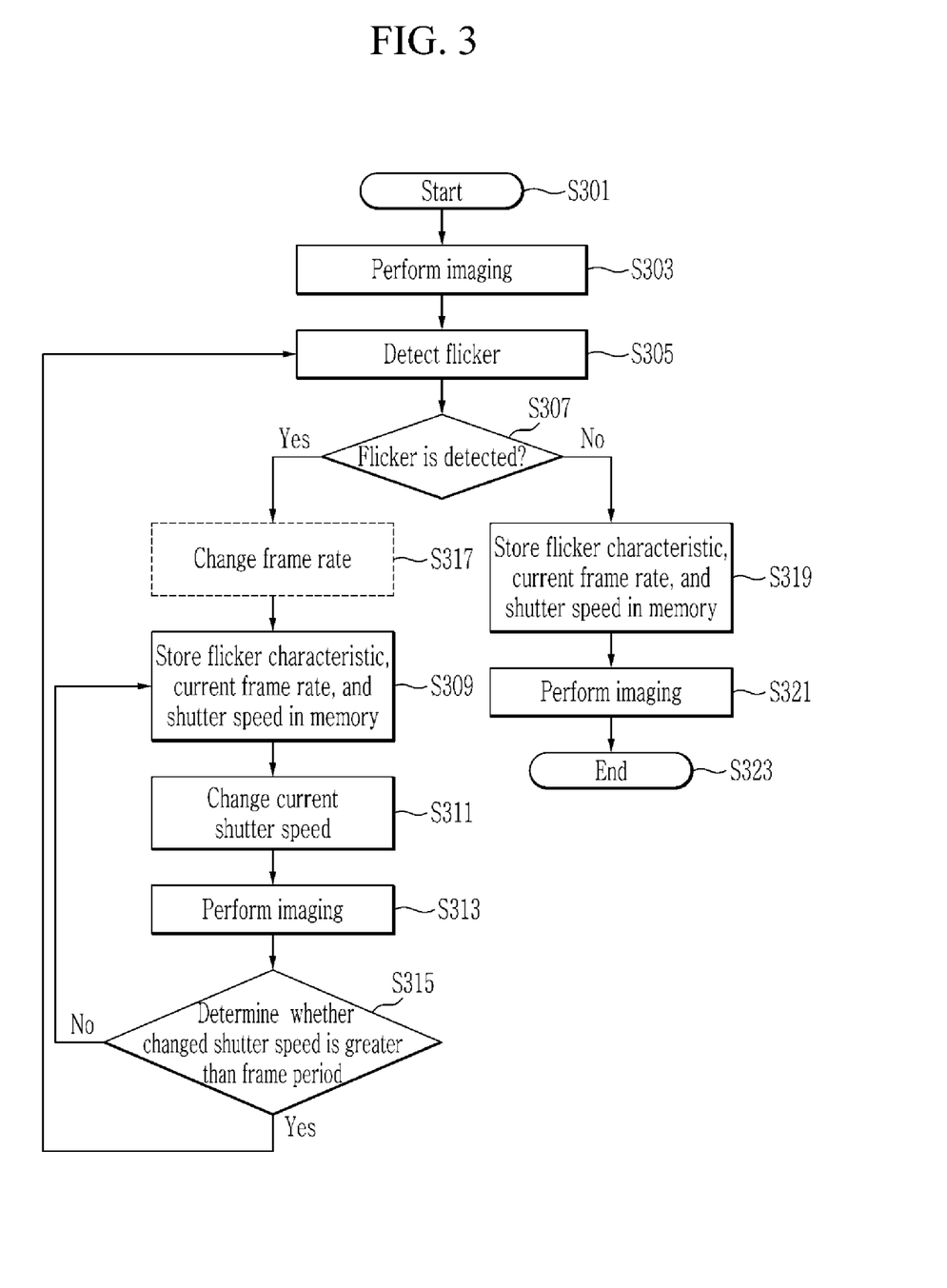
FIG. 3 illustrates a flowchart of an operation of an imaging apparatus according to an embodiment.

FIG. 3 illustrates a flowchart of an operation of an imaging apparatus according to an embodiment.

First, when a control signal for controlling an on/off of a power is input through the manipulation device 300, the imaging apparatus 10 is turned on and a process may start (S301).

In response to a shutter-release signal for capturing an image being input through the manipulation device 300, the imaging element 105 performs imaging at a first frame rate and a first shutter speed (S303). The captured image may be stored in the memory 400 together with the first frame rate and the first shutter speed. In this case, the first shutter speed may be the same as a first frame period, which is a reciprocal of the first frame rate, or may be smaller than the first frame period.

After capturing an image at the first frame rate and the first shutter speed, it is determined whether a flicker exists in the captured image (S305). The controller 600 may generate a difference image between a plurality of adjacent images and integrate the generated difference image in a horizontal direction of a screen to detect flicker by obtaining an integral value for each signal line. In addition, the controller 600 may detect a flicker by generating difference images between a plurality of adjacent images and detecting pixel value variations in a direction perpendicular to a scan direction of each of the difference images. In this case, the controller 600 may detect a characteristic of a flicker that exists in the image.

It is determined (S307) whether or not the flicker is detected by the detecting of the flicker (S305). In response to the flicker being detected, the imaging apparatus 10 performs step S309.

The controller 600 stores the detected flicker characteristic, the first frame rate, and the first shutter speed in the memory 400 (S309).

The flicker characteristic may be or include information related to at least one of a number of stripes caused by a flicker in one frame, a distance between the stripes, and intensity of the stripes.

In this case, the current first shutter speed may not be synchronized with the driving frequency of the display device. For instance, the first shutter speed may not be an integer multiple of a driving period of the display device.

The controller 600 changes the first shutter speed to a second shutter speed (S311). Herein, the second shutter speed may be different from the first shutter speed.

The controller 600 controls the imaging element 105 to perform imaging at the first frame rate and the changed second shutter speed (S313).

Thereafter, the controller 600 determines whether the changed second shutter speed is greater than the first frame period (S315).

In response to the changed second shutter speed being smaller than the first frame period, the controller 600 returns to step S309 again, and stores the flicker characteristic, the first frame rate, and the second shutter speed in the image captured in step S313 in the memory (S309).

In response to the changed second shutter speed being greater than the first frame period, step S305 is performed.

The controller 600 detects a flicker in the image captured in step S313 (S305).

The controller 600 determines (S307) whether or not the flicker is detected by the detecting of the flicker (S305). In response to the flicker being detected, the imaging apparatus 10 performs step S317.

The controller 600 changes the first frame rate to a second frame rate (S317). In some embodiments, the changing of the first frame rate (S317) is not performed when the imaging apparatus 10 performs initial imaging, and may be performed only after it is determined in step S315 that the shutter speed changed in step S311 is greater than the current frame period.

Herein, the second frame rate may be different from the first frame rate. In this case, the second frame rate may be greater than the first frame rate. A second frame period, which is a reciprocal of the second frame rate, may be the same as the changed second shutter speed or may be greater than the second shutter speed.

The controller stores the flicker characteristic, the second frame rate, and the second shutter speed in the image captured in step S313 in the memory (S309).

Thereafter, the controller 600 changes the second shutter speed to a third shutter speed again (S311).

The controller 600 controls the imaging element 105 to perform imaging at the changed second frame rate and the third shutter speed (S313).

The controller 600 determines whether the changed third shutter speed is greater than the second frame period, and performs step S305 or S309.

Steps S303 to S317 may be repeated and continuously performed until no flicker is detected in the captured image.

In response to a flicker not being detected by the detecting of the flicker (S305), the imaging apparatus 10 performs step S319.

The controller 600 stores a detected flicker characteristic, a current frame rate, and a current shutter speed in the memory 400 (S319). Since no flicker is detected, the current frame rate may be a flicker-free frame rate, and the current shutter speed may be a flicker-free shutter speed.

In this case, a number of stripes occurring due to the flicker in one frame may be zero. In addition, the flicker-free shutter speed may be synchronized with the driving frequency of the display device. For instance, the flicker-free shutter speed may be an integer multiple of a driving period of the display device. Therefore, integral values of luminance in each signal line within one frame may be the same.

The controller 600 may store the flicker characteristic, the current frame rate, and the shutter speed in the memory 400 by repeating steps S303 to S317. In addition, the controller 600 may learn information stored in the memory 400 by substituting them into a deep learning/machine learning model. Herein, the learning may allow the frame rate and the shutter speed at which a flicker is reduced by using the frame rate and the shutter speed corresponding to the flicker characteristic stored in the memory 400 in steps S309 and S319 to be determined. As such, the deep learning/machine learning model may derive a frame rate and a shutter speed at which flicker is reduced when a flicker characteristic, a corresponding frame rate, and a shutter is speed are input. As more data are used for learning, an ability to derive an appropriate frame rate and shutter speed for reducing flicker may be improved. The controller 600 may derive an optimal frame rate and shutter speed using a pre-learned deep learning/machine learning model.

Thereafter, the imaging apparatus 10 performs imaging again (S321).

Then, the process may end (S323).

Figure 4:
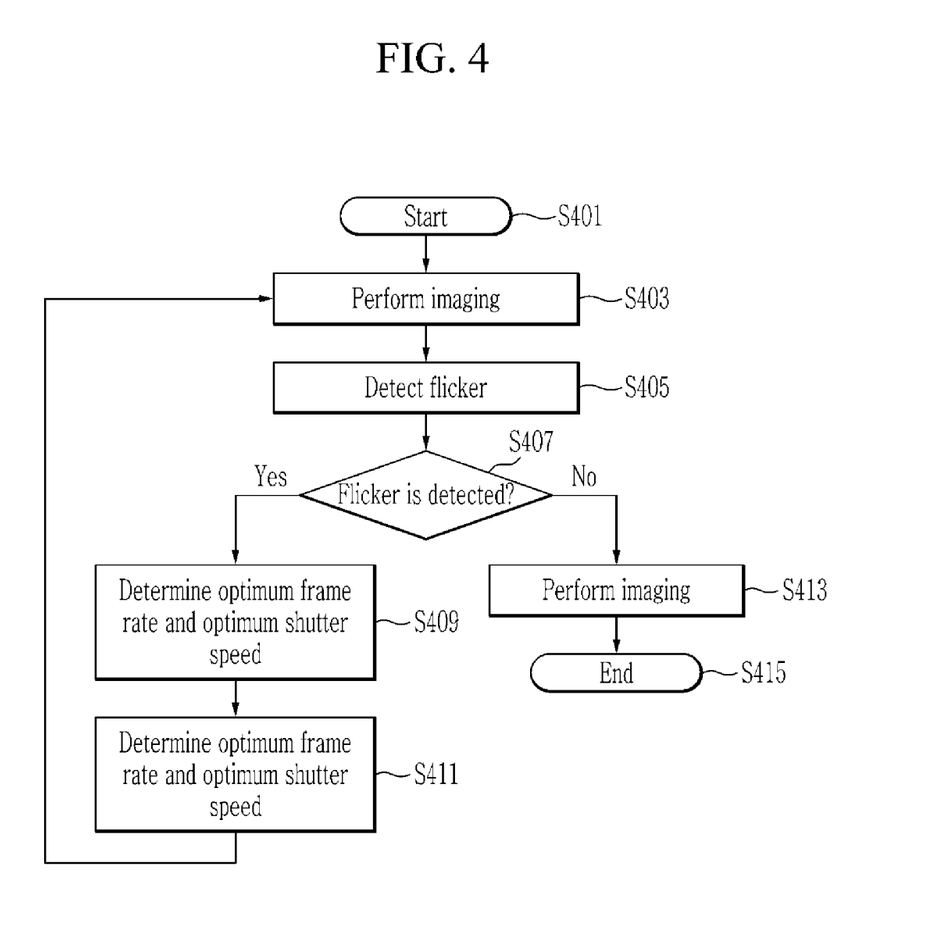
FIG. 4 illustrates a flowchart of an operation of an imaging apparatus learned by a method of FIG. 3 according to an embodiment.

FIG. 4 illustrates a flowchart of an operation of an imaging apparatus learned by a method of FIG. 3 according to an embodiment.

First, in response to a control signal for controlling an on/off of a power being input through the manipulation device 300, the imaging apparatus 10 is turned on and a process may start (S401).

In response to a shutter-release signal for capturing an image being input through the manipulation device 300, the imaging element 105 performs imaging at a first frame rate and a first shutter speed (S403).

After capturing an image at the first frame rate and the first shutter speed, it is determined whether a flicker exists in the captured image (S405).

It is determined (S407) whether or not the flicker is detected by the detecting of the flicker (S405). In response to the flicker being detected, the imaging apparatus 10 performs step S409.

The controller 600 determines an optimum frame rate and an optimum shutter speed (S409).

In this case, in response to data on the flicker characteristic and the current situation, e.g., information related to the first frame rate and the first shutter speed, being input from the imaging element 105 to the controller 600, the controller 600 may determine an optimal frame rate and an optimal shutter speed using data stored in the memory 400 of the imaging apparatus 10.

Additional or alternatively, the controller 600 may determine an optimal frame rate and an optimal shutter speed using a deep learning/machine learning model learned to determine the frame rate and the shutter speed at which the flicker is reduced by using the flicker characteristic stored in the memory 400 and the frame rate and the shutter speed corresponding thereto.

The controller 600 may change the shutter speed of the shutter unit 103 using the optimal frame rate and the optimal shutter speed that are determined (S411).

In response to a flicker not being detected by the detecting of the flicker (S405), the imaging apparatus 10 performs step S413.

The imaging apparatus 10 performs imaging again (S413).

Then, the process may end (S415).

Various embodiments may be implemented in the form of a computer program that can be executed through various components on a computer, and such a computer program may be recorded in a computer-readable medium, e.g., a non-transitory computer-readable medium. In this case, the medium may include a hardware device configured to store and execute program instructions, including a magnetic medium, such as a hard disk, a floppy disk, and a magnetic tape, an optical recording medium, such as a CD-ROM and a DVD, a magneto-optical medium, such as a floptical disk, and a ROM, a RAM, a flash memory, etc.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. An imaging apparatus comprising:
   an imaging element configured to convert light into an electrical signal;
   an imaging driver configured to drive the imaging element;
   a signal processor configured to process the electrical signal and output a video signal for a screen;
   a controller configured to integrate the video signal in a first direction of the screen, acquire an integral value of the video signal for each line in the first direction, and detect a flicker in an image captured by the imaging apparatus by determining a difference between integral values in adjacent lines; and
   a memory configured to, in response to the flicker being detected, store data on a characteristic of the flicker, a first frame rate, and a first shutter speed of the imaging element,
   wherein the controller is configured to control the imaging element driver to perform imaging at a second frame rate different from the first frame rate using a pre-learned deep learning/machine learning model, and
   wherein the deep learning/machine learning model is a model learned utilizing a flicker characteristic at a frame rate of the imaging element to determine a second frame rate at which the flicker is reduced.

2. The imaging apparatus of claim 1, wherein the first direction is a horizontal direction of the screen and the second frame rate is greater than the first frame rate.

3. The imaging apparatus of claim 1, wherein the flicker characteristic is related to at least one of a number of stripes caused by a flicker in one frame image, a distance between the stripes, and intensity of the stripes.

4. The imaging apparatus of claim 1, wherein the characteristic of the flicker comprises a number of stripes caused by the flicker in one frame image and a distance between the stripes.

5. The imaging apparatus of claim 4, wherein
   the memory is further configured to store an image associated with the flicker among images associated with flickers, and
   the deep learning/machine learning model is configured to classify the image associated with the flicker among the images associated with the flickers using the data to determine the second frame rate at which the flicker is reduced.

6. The imaging apparatus of claim 1, wherein the deep learning/machine learning model is configured to receive at least one intermediate frame rate and a determination of a flicker associated with the at least one intermediate frame rate as feedback information to determine the second frame rate at which the flicker is reduced.

7. The imaging apparatus of claim 4, wherein
   in response to the flicker existing in the image, the controller is configured to store the image among images associated with flickers, and
   the deep learning/machine learning model is configured to classify the image among the images using the flicker characteristic to determine the flicker-free frame rate.

8. An imaging apparatus comprising:
   an imaging element comprising a shutter unit and a plurality of pixels, the imaging element being configured to convert light received by opening and closing the shutter unit into an electric signal;

a signal processor configured to process the electrical signal and output a video signal, and a controller configured to:
- integrate the video signal, acquire an integral value of the video signal for each line;
- detect whether or not a flicker exists in an image captured by the imaging element and a flicker characteristic by determining a difference between integral values in adjacent lines;
- in response to a flicker existing in the image, input the flicker characteristic of the flicker and a frame rate and a shutter speed in which the flicker characteristic is recognized to a pre-learned deep learning/machine learning model to determine a flicker-free frame rate, wherein the deep learning/machine learning model is pre-learned using data on the flicker characteristic stored in a memory, the frame rate, and the shutter speed;
- receive the flicker-free frame rate from the deep learning/machine learning model;
- drive the imaging element at a first frame rate and a first shutter speed based on the flicker characteristic; and
- control the imaging element driver to drive the imaging element at the flicker-free frame rate and the flicker-free shutter speed.

9. The imaging apparatus of claim 8, further comprising:
the memory configured to store data on the flicker characteristic, the frame rate, the shutter speed,
wherein the deep learning/machine learning model is pre-learned utilizing the data on the flicker characteristic, the frame rate, and the shutter speed stored in the memory.

10. The imaging apparatus of claim 9, wherein the flicker characteristic is related to at least one of a number of stripes caused by a flicker in one frame image, a distance between the stripes, and intensity of the stripes.

11. The imaging apparatus of claim 8, wherein the flicker characteristic comprises a number of stripes caused by the flicker in one frame image and a distance between the stripes.

12. The imaging apparatus of claim 8, wherein the deep learning/machine learning model is configured to receive at least one intermediate frame rate and a determination of a flicker associated with the at least one intermediate frame rate as feedback information to determine the flicker-free frame rate.

13. The method of claim 11, further comprising:
storing, in response to the flicker being detected, an image associated with the flicker among images associated with flickers,
wherein the deep learning/machine learning model is configured to classify the image associated with the flicker among the images associated with the flickers using the flicker characteristic to determine the second frame rate.

14. A method of controlling an imaging apparatus, the method comprising:
- performing, via an imaging element, imaging at a first frame rate and a first shutter speed;
- processing, via a signal processor, an electrical signal received from the imagine element and outputting a video signal for a screen;
- integrating, via a controller, the video signal in a first direction of the screen and acquire an integral value of the video signal for each line in the first direction;
- detecting, via a controller, a flicker in a captured image by determining a difference between integral values in adjacent lines;
- storing, in response to a flicker being detected, a flicker characteristic, a frame rate, and a shutter speed in a memory; and
- changing, via the controller, the first frame rate to a second frame rate in response to the flicker being detected in the captured image,
wherein the second frame rate is different from the first frame rate,
wherein changing the first frame rate to the second frame rate comprises determining, via the controller, a second frame rate using a pre-learned deep learning/machine learning model, and
wherein the deep learning/machine learning model is pre-learned using data on the flicker characteristic, the frame rate, and the shutter speed.

15. The control method of claim 14, wherein the first direction is a horizontal direction of the screen and the second frame rate is greater than the first frame rate.

16. The control method of claim 14, wherein the flicker characteristic is related to at least one of a number of stripes caused by a flicker in one frame image, a distance between the stripes, and an intensity of the stripes.

17. The method of claim 14, wherein the flicker characteristic comprises a number of stripes caused by the flicker in one frame image and a distance between the stripes.

18. The method of claim 14, wherein the deep learning/machine learning model is configured to receive at least one intermediate frame rate and a determination of a flicker associated with the at least one intermediate frame rate as feedback information to determine the second frame rate.

19. A non-transitory recording medium comprising a program configured to perform the method of claim 14 in response to being executed by at least one processor.

* * * * *